A. J. McRAY.
Vehicle-Spring Braces.
No. 152,300. Patented June 23, 1874.
Fig: 1.
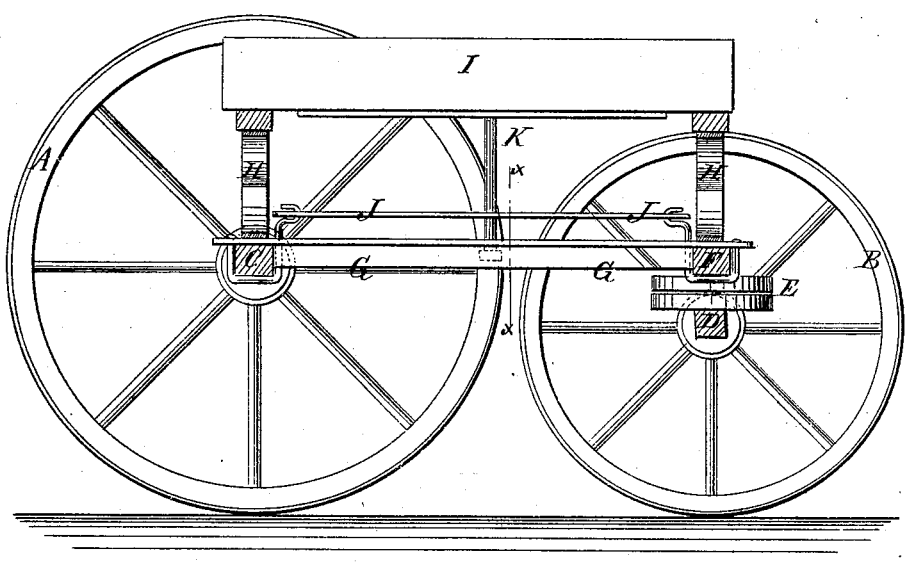
Fig: 2.
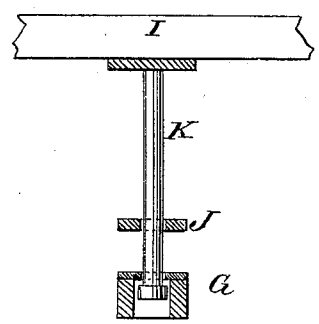

UNITED STATES PATENT OFFICE.

ANDREW J. McRAY, OF ALMA, WISCONSIN.

IMPROVEMENT IN VEHICLE-SPRING BRACES.

Specification forming part of Letters Patent No. 152,300, dated June 23, 1874; application filed April 11, 1874.

*To all whom it may concern:*

Be it known that I, ANDREW J. McRAY, of Alma, Buffalo county, Wisconsin, have invented a new and useful Improvement in Buggies and other Vehicles, of which the following is a specification:

Figure 1 is a vertical longitudinal section of a buggy to which my improvement has been applied; and Fig. 2 is a detail cross-section of the same, taken through the line $x\ x$, Fig. 1.

Similar letters of reference indicate corresponding parts.

My invention has for its object to furnish an improved attachment for buggies and other vehicles, to prevent the body of the vehicle from moving forward when the wheels go into a hole, and to prevent the springs from jumping up, and thus to prevent the springs from being injured or broken. The invention consists in the combination of the brace and rod with the rear axle, the forward bolster, the reach, and the body of the vehicle, as hereinafter fully described.

A are the rear wheels. B are the forward wheels. C is the rear axle. D is the forward axle. E is the fifth-wheel. F is the forward bolster. G is the reach. H are the springs. I is the body of the vehicle, about the construction of which parts there is nothing new. J is a brace, the rear end of which is connected with the rear axle C, and its forward end is connected with the forward bolster F. K is a rod, which passes up through a hole in the reach G, through a hole in the brace J, and its upper end is firmly secured to the body I of the vehicle. The rod K has a head formed upon its lower end to prevent it from being drawn up through the reach G.

By this construction the rod K and the brace J will prevent the body of the vehicle from being thrown forward when the wheels enter a hole, and will also prevent the springs from jumping up, so that the springs will be prevented from being injured or broken by these causes. The brace J and rod K will operate with the same effect, whether the vehicle be loaded or not.

The brace-straps, which are ordinarily attached to vehicles, become loose, and do not operate when the vehicle is loaded, and thus allow the body of the vehicle to pitch forward at every jolt to the great injury of the springs.

Having thus described my invention, I claim as new, and desire to secure by Letters Patent—

The combination of the brace J, rod K, the rear axle C, forward bolster F, reach G, and body I, substantially as and for the purpose shown and described.

ANDREW J. McRAY.

Witnesses:
CHAS. SCHAETTLE,
CHAS. SCHAETTLE, Jr.